(12) United States Patent
Kawabe et al.

(10) Patent No.: US 10,040,479 B2
(45) Date of Patent: Aug. 7, 2018

(54) ESTIMATED STEERING ANGLE CALCULATION DEVICE FOR VEHICLE

(71) Applicant: HONDA MOTOR CO., LTD., Tokyo (JP)

(72) Inventors: Satoshi Kawabe, Wako (JP); Shigeki Ehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/278,831

(22) Filed: Sep. 28, 2016

(65) Prior Publication Data

US 2017/0088173 A1    Mar. 30, 2017

(30) Foreign Application Priority Data

Sep. 29, 2015    (JP) ................. 2015-190802

(51) Int. Cl.
*B62D 15/00*    (2006.01)
*B62D 1/00*    (2006.01)
*B62D 15/02*    (2006.01)

(52) U.S. Cl.
CPC ............. *B62D 15/024* (2013.01); *B62D 1/00* (2013.01); *B62D 15/021* (2013.01)

(58) Field of Classification Search
CPC ..... B62D 15/00; B62D 15/021; B62D 15/024
See application file for complete search history.

(56) References Cited

U.S. PATENT DOCUMENTS

| | | | |
|---|---|---|---|
| 7,426,975 B2 * | 9/2008 | Toyota | B60K 6/445 180/165 |
| 2006/0196712 A1 * | 9/2006 | Toyota | B60K 6/445 180/165 |

FOREIGN PATENT DOCUMENTS

WO    2011/048702 A1    4/2011

\* cited by examiner

*Primary Examiner* — Yonel Beaulieu
(74) *Attorney, Agent, or Firm* — Westerman, Hattori, Daniels & Adrian, LLP

(57) ABSTRACT

There is provided an estimated steering angle calculation device for a vehicle capable of suppressing deterioration in accuracy of an estimated steering angle even if vehicle wheels slips or is locked due to acceleration or deceleration of the vehicle. Although, when being accelerated during turning, tire gripping force of front wheels serving as a driving wheel increases and a difference between wheel speeds of the front wheels decreases so that an estimated steering angle $\theta es$ relative to an actual steering angle $\theta act$ tends to decrease, the deterioration in accuracy of the estimated steering angle $\theta es$ due to this tendency can be suppressed by increasing a second contribution rate relative to the estimated steering angle $\theta es$ on the rear wheel side and decreasing a first contribution rate on the front wheel side in accordance with an accelerator opening degree.

18 Claims, 10 Drawing Sheets

ESTIMATED STEERING ANGLE CALCULATION DEVICE FOR VEHICLE

CROSS REFERENCES TO RELATED APPLICATIONS

The present application claims priority under 35 U.S.C. § 119 to Japanese Patent Application No. 2015-190802, filed Sep. 29, 2015, entitled "Estimated Steering Angle Calculation Device for Vehicle." The contents of this application are incorporated herein by reference in their entirety.

TECHNICAL FIELD

The present disclosure relates to an estimated steering angle calculation device for a vehicle for calculating an estimated steering angle of a vehicle based on a wheel speed of the vehicle.

BACKGROUND

A control steering angle computing part of an electric power steering device disclosed in International publication WO 2011/048702 is configured to find an average estimated steering angle by averaging a first estimated steering angle of a steering wheel (turning wheel) which is estimated by using wheel speeds of left and right wheels on the front wheel side and a second estimated steering angle of the steering wheel which is estimated by using wheel speeds of left and right wheels on the rear wheel side (WO 2011/048702, page 28, formula (6)).

In the International publication WO 2011/048702, there are described formulae (WO 2011/048702, page 4, formulae (1) and (2), FIG. 18) according to the Ackermann-Jeantaud theory which forms the basis of calculating the first estimated steering angle and the second estimated steering angle

SUMMARY

WO 2011/0487021 has a description that, even if any of the wheel speeds has abnormality, a robust redundant system which is not subject to influence of the abnormality may be formed by using the average estimated steering angle (WO 2011/048702, page 28).

However, in the case where a disturbance is generated in the first estimated steering angle and the second estimated steering angle by slip (idle running) or lock of the wheels due to acceleration or deceleration of the vehicle, the average estimated steering angle may not guarantee the accuracy. This is not referred to in the International publication WO 2011/048702, and there is room for improvement.

Thus, it is preferable to provide an estimated steering angle calculation device for a vehicle which is capable of improving the accuracy of an estimated steering angle (suppressing the deterioration in accuracy of the estimated steering angle) even if the disturbance is generated in a first estimated steering angle and a second estimated steering angle by slip or lock of wheels due to acceleration or deceleration of the vehicle A first aspect of an estimated steering angle calculation device for a vehicle comprises a front wheel speed difference calculating part for detecting each of wheel speeds of left and right front wheels of the vehicle and calculating a front wheel speed difference between the left and right front wheels, a rear wheel speed difference calculating part for detecting each of wheel speeds of left and right rear wheels of the vehicle and calculating a rear wheel speed difference between the left and right rear wheels, a first estimated steering angle calculating part for calculating a first estimated steering angle based on the front wheel speed difference, a second estimated steering angle calculating part for calculating a second estimated steering angle based on the rear wheel speed difference, an accelerator opening degree sensor for detecting an accelerator opening degree of the vehicle, and an estimated steering angle calculation section for calculating an estimated steering angle of the vehicle, wherein the estimated steering angle calculation section calculates a first contributory portion estimated steering angle which is a contributory portion of the first estimated steering angle to the estimated steering angle of the vehicle, based on the accelerator opening degree, and calculates a second contributory portion estimated steering angle which is a contributory portion of the second estimated steering angle to the estimated steering angle of the vehicle, based on the accelerator opening degree, and wherein the estimated steering angle of the vehicle is calculated by combining the first contributory portion estimated steering angle and the second contributory portion estimated steering angle.

According to this aspect, since the first estimated steering angle based on the difference between the wheel speeds of the left and right front wheels and the second estimated steering angle based on the difference between the wheel speeds of the left and right rear wheels are weighted and combined based on the accelerator opening degree thereby to calculate the estimated steering angle, it is possible to suppress the deterioration in accuracy of the estimated steering angle due to the disturbance of the wheel speed attributable to a tire slip (wheel slip) at the time of acceleration.

In this case, the estimated steering angle calculation section is configured such that the first contributory portion estimated steering angle corresponding to the contributory portion of the first estimated steering angle is decreased and the second contributory portion estimated steering angle corresponding to the contributory portion of the second estimated steering angle is increased with increase of the accelerator opening degree. Therefore, a sudden change (violent movement) of the estimated steering angle which is a control output value at the time of acceleration can be prevented.

Another aspect of the estimated steering angle calculation device for a vehicle comprises the front wheel speed difference calculating part for detecting each of the wheel speeds of the left and right front wheels of the vehicle and calculating the front wheel speed difference between the left and right front wheels, the rear wheel speed difference calculating part for detecting each of the wheel speeds of the left and right rear wheels of the vehicle and calculating the rear wheel speed difference between the left and right rear wheels, the first estimated steering angle calculating part for calculating the first estimated steering angle based on the front wheel speed difference, the second estimated steering angle calculating part for calculating the second estimated steering angle based on the rear wheel speed difference, an accelerator opening degree change amount detecting part for detecting a change amount of an accelerator opening degree of the vehicle, and then estimated steering angle calculation section for calculating the estimated steering angle of the vehicle, wherein the estimated steering angle calculation section calculates the first contributory portion estimated steering angle which is the contributory portion of the first estimated steering angle to the estimated steering angle of the vehicle, based on the change amount of the accelerator opening degree, and calculates the second contributory portion estimated steering angle which is the contributory portion of the second estimated steering angle to the estimated steering angle of the vehicle, based on the change amount of the accelerator opening degree, and wherein the estimated steering angle of the vehicle is calculated by combining the first contributory portion estimated steering angle and the second contributory portion estimated steering angle.

According to this aspect, since the first estimated steering angle based on the difference between the wheel speeds of the left and right front wheels and the second estimated steering angle based on the difference between the wheel speeds of the left and right rear wheels are weighted and combined based on the change amount of the accelerator opening degree thereby to calculate the estimated steering angle, it is possible to suppress the deterioration in accuracy of the estimated steering angle due to the disturbance of the wheel speed attributable to a tire slip (wheel slip) at the time of acceleration.

In this case, the estimated steering angle calculation section is configured such that the first contributory portion estimated steering angle corresponding to the contributory portion of the first estimated steering angle is decreased and the second contributory portion estimated steering angle corresponding to the contributory portion of the second estimated steering angle is increased with increase of the change amount of the accelerator opening degree. Therefore, the sudden change (violent movement) of the estimated steering angle which is the control output value at the time of acceleration can be prevented.

Another aspect of the estimated steering angle calculation device for a vehicle comprises the front wheel speed difference calculating part for detecting each of the wheel speeds of the left and right front wheels of the vehicle and calculating the front wheel speed difference between the left and right front wheels, the rear wheel speed difference calculating part for detecting each of the wheel speeds of the left and right rear wheels of the vehicle and calculating the rear wheel speed difference between the left and right rear wheels, the first estimated steering angle calculating part for calculating the first estimated steering angle based on the front wheel speed difference, the second estimated steering angle calculating part for calculating the second estimated steering angle based on the rear wheel speed difference, a brake treading force detecting part for detecting brake treading force of the vehicle, and the estimated steering angle calculation section for calculating the estimated steering angle of the vehicle, wherein the estimated steering angle calculation section calculates the first contributory portion estimated steering angle which is the contributory portion of the first estimated steering angle to the estimated steering angle of the vehicle, based on the brake treading force, and calculates the second contributory portion estimated steering angle which is the contributory portion of the second estimated steering angle to the estimated steering angle of the vehicle, based on the brake treading force, and wherein the estimated steering angle of the vehicle is calculated by combining the first contributory portion estimated steering angle and the second contributory portion estimated steering angle.

According to this aspect, since the first estimated steering angle based on the difference between the wheel speeds of the left and right front wheels and the second estimated steering angle based on the difference between the wheel speeds of the left and right rear wheels are weighted and combined based on the brake treading force, it is possible to suppress the deterioration in accuracy of the estimated steering angle due to the disturbance of the wheel speed attributable to a wheel lock and the like at the time of deceleration.

In this case, the estimated steering angle calculation section is configured such that the first contributory portion estimated steering angle corresponding to the contributory portion of the first estimated steering angle is decreased and the second contributory portion estimated steering angle corresponding to the contributory portion of the second estimated steering angle is increased with increase of the brake treading force. Therefore, the sudden change (violent movement) of the estimated steering angle which is the control output value at the time of deceleration can be prevented.

According to the present disclosure, for example, even if the disturbance is generated in the first estimated steering angle and the second estimated steering angle by the slip or lock of the wheels due to the acceleration or deceleration of the vehicle, the accuracy of the estimated steering angle can be improved (the deterioration in accuracy of the estimated steering angle can be suppressed). Precisely, the accuracy of the estimated steering angle can be guaranteed even if the vehicle is accelerated or decelerated.

BRIEF DESCRIPTION OF THE DRAWINGS

The advantages of the disclosure will become apparent in the following description taken in conjunction with the following drawings.

DETAILED DESCRIPTION

Hereunder, preferred embodiments of an estimated steering angle calculation device for a vehicle according to the present disclosure will be explained with reference to accompanying drawings.

[First Embodiment]

Figure 1:
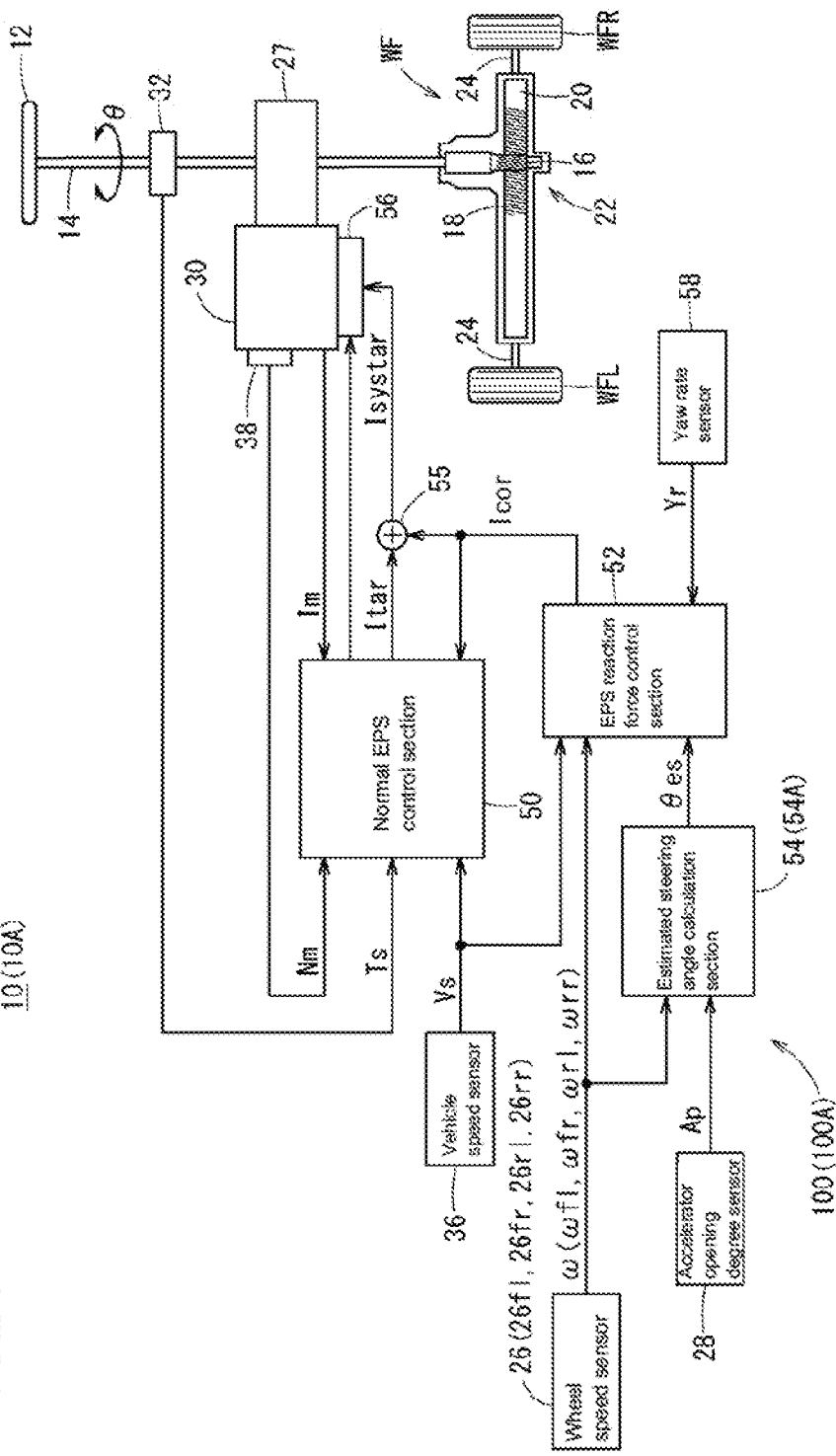
FIG. 1 is a schematic configuration diagram of an electric power steering device in which an estimated steering angle calculation device for a vehicle in accordance with a first embodiment of the present disclosure is installed.

FIG. 1 is a schematic configuration diagram of an electric power steering device (EPS device) 10 in which an estimated steering angle calculation device 100 for a vehicle in accordance with a first embodiment of the present disclosure is installed.

The electric power steering device 10 loaded into the vehicle (not shown) is configured to apply torque (assist torque) which assists steering torque applied by a driver, to a steering shaft 14 connected to a steering handle 12.

An upper end of the steering shaft 14 is connected to the steering handle 12, and a pinion 16 is mounted on a lower end of the steering shaft. There is arranged a rack shaft 20 having a rack 18 which meshes with the pinion 16.

A rack and pinion mechanism 22 is formed by the pinion 16 and the rack 18. Tie rods 24 are provided on each end of the rack shaft 20. Front wheels (steering wheels and driving wheels) WF (a left front wheel WFL and a right front wheel WFR) are mounted on each outer end of the tie rods 24. Although not shown in the drawings, rear wheels (driven wheels) WR (a left rear wheel WRL and a right rear wheel WRR) are mounted on each end of a rear wheel axle.

A motor (a brushless motor or a brush motor) 30 is fitted against the steering shaft 14 through a speed reduction mechanism 27 serving as a power transmission device. The motor 30 is configured to output rotational force for assisting the steering torque. This rotational force is energized via the speed reduction mechanism 27 thereby to be applied to the steering shaft 14 as the assist torque.

The steering shaft 14 is also provided with a steering torque sensor 32. When the steering torque which is generated at the time the driver operates the steering handle 12 is applied to the steering shaft 14, the steering torque sensor 32 detects magnitude and direction of the steering torque added to the steering shaft 14 and outputs steering torque Ts, which is an electric signal in proportion to the magnitude of the detected steering torque, and the direction. The steering torque sensor 32 is constituted by using a torsion bar, for example. In the following explanation, the steering torque Ts shall include the steering direction in order to eliminate complexity.

Further, various kinds of sensors are installed in the vehicle into which the electric power steering device 10 is loaded. A vehicle speed sensor 36 for detecting and outputting a vehicle speed Vs which is an electric signal corresponding to a travelling speed of the vehicle is provided in a transmission (not shown) and the like.

Further, each of four wheels (left front wheel WFL, right front wheel WFR, left rear wheel WRL and right rear wheel WRR) is furnished with a wheel speed sensor 26 (left front wheel speed sensor 26fl, right front wheel speed sensor 26fr, left rear wheel speed sensor 26rl and right rear wheel speed sensor 26rr), respectively. Each of the wheel speed sensors is configured to detect and output a wheel speed ω (left front wheel speed ωfl, right front wheel speed ωfr, left rear wheel speed ωrl and right rear wheel speed ωrr), respectively.

Further, a throttle, not shown, is furnished with an accelerator opening degree sensor 28 for detecting and outputting an opening degree of the throttle (to be referred to as an accelerator opening degree Ap) which is controlled based on the operation of an accelerator pedal (not shown) by the driver.

Furthermore, the motor 30 is furnished with a revolution sensor 38 such as a resolver and the like for detecting and outputting a motor revolution speed (number of revolution) Nm and a rotational direction of the motor.

Moreover, the electric power steering device 10 includes a normal EPS control section 50, an EPS reaction force control section 52, an estimated steering angle calculation section 54 and a motor drive control section 56 each of which has a control device such as ECU (electronic control unit) and the like.

The normal EPS control section 50, as is well known in the art, calculates a target assist current value Itar based on the steering torque Ts and the vehicle speed Vs thereby to output it to one of input terminals of an adder 55.

The EPS reaction force control section 52, as is well known in the art, calculates a reaction force current value (correction assist current value) Icor for applying reaction force to the operation of the steering handle 12 of the driver, based on the vehicle speed Vs, the wheel speed ω, an estimated steering angle θes and each of outputs of a yaw rate sensor 58 and a lateral acceleration sensor (not shown) thereby to output it to the other of the input terminals of the adder 55.

The adder 55 calculates a target motor current value (corrected target assist current value) Isystar which is a combined current value of the target assist current value Itar and a reaction force current value Icor, thereby to output it to the motor drive control section 56.

The motor drive control section 56 is configured to drive and control the motor 30 based on the target motor current value Isystar.

In this case, the normal EPS control section 50 captures also a current Im flowing into the motor 30 and feedback-controls the motor drive control section 56 so as to achieve the target assist current value Itar, so that the operation of the steering handle 12 by the driver can be accurately assisted through the speed reduction mechanism 27 and the steering shaft 14 by the assist torque of the motor 30 corresponding to the target motor current value Isystar.

On the other hand, when the under-steer in a state where the front wheels WFL, WFR have slipped for example, is detected by the output of the wheel speed sensor 26 and a yaw rate Yr which is an output of the yaw rate sensor 58, etc., the EPS reaction force control section 52 outputs the correction assist current value Icor consisting of the reaction current value for making harder the further turning of the steering handle by the driver by weighting the operation of the steering handle 12 in the direction to be turned, based on the steering angle (estimated steering angle θes to be referred to later) of the vehicle and the vehicle speed Vs.

Further, when the over-steer in a state where the rear wheels WRL, WRR have slipped, is detected by the output of the wheel speed sensor 26 and the yaw rate Yr which is the output of the yaw rate sensor 58, etc., the EPS reaction force control section 52 outputs the correction assist current value Icor consisting of the reaction current value based on the steering angle (estimated steering angle θes) of the vehicle and the vehicle speed Vs in order for lightening the operation of the steering handle 12 in the direction opposite to the direction to be turned, so that the driver can operate (counter-steer) the steering handle 12 quickly in the direction opposite to the direction to be turned.

The electric power steering device 10 provided with the EPS reaction force control section 52 is also referred to as a motion adaptive EPS device.

Like this, in the electric power steering device 10, the steering angle of the vehicle is required for operating the EPS reaction force control section 52.

[Explanation of the Estimated Steering Angle Calculation Section 54]

Next, the estimated steering angle calculation section 54 forming an essential part of this embodiment, which estimates the steering angle of the steering wheel (the front wheels WFL, WFR in this embodiment) without using a steering angle sensor for cost reduction will be explained.

<Explanation of Prerequisite>

First, the prerequisites (i) to (vi) for calculating the estimated steering angle θes of the vehicle will be explained.

(i) The estimated steering angle θes of the vehicle is estimated by the Ackermann-Jeantaud theory based on differences ωfl−ωfr, ωrl−ωrr between the wheel speeds of the left and right front wheels WFL, WFR and between the wheel speeds of the left and right rear wheels WRL, WRR.

Figure 2:
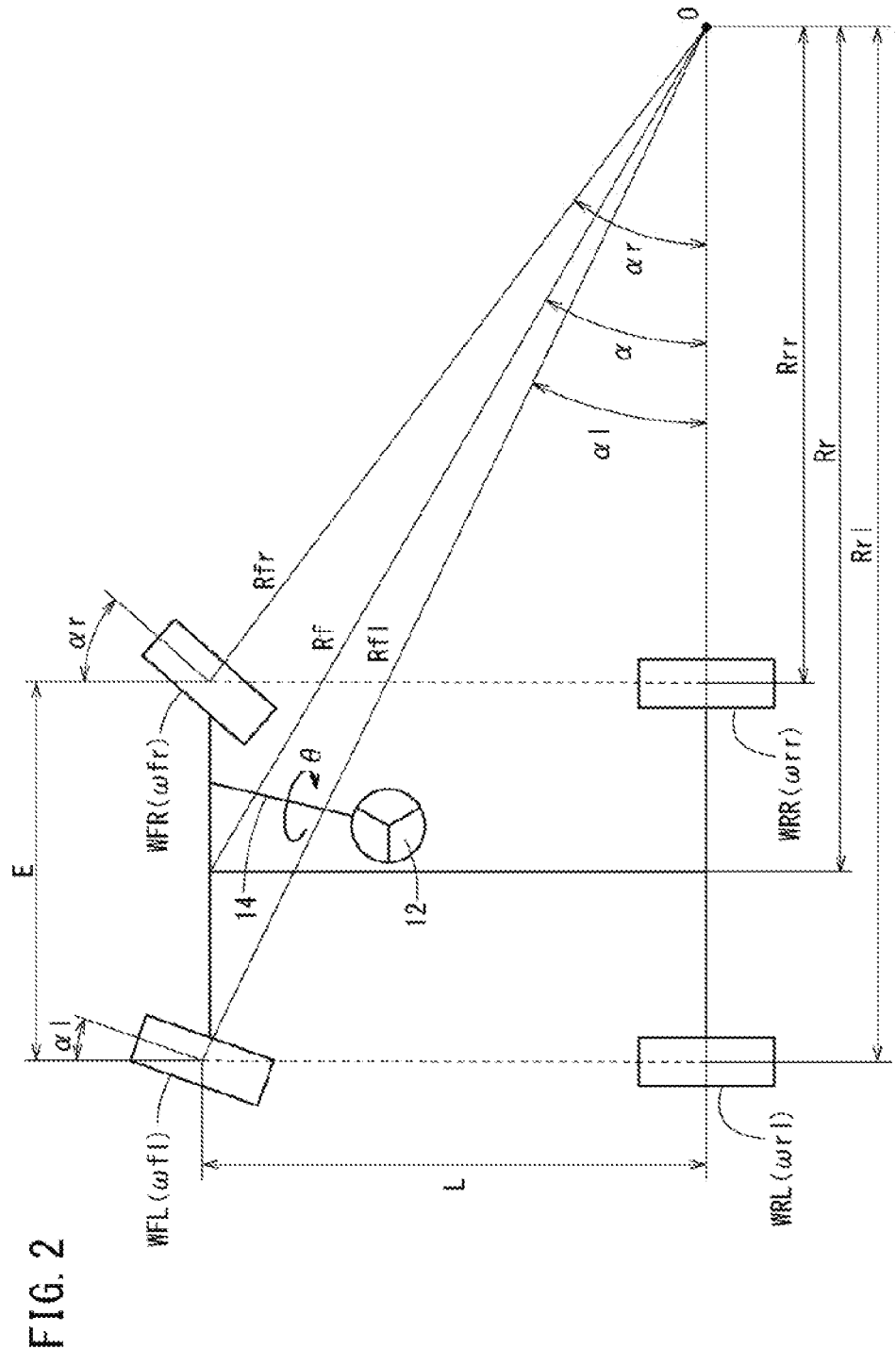
FIG. 2 is a planar schematic view of a vehicle in which each of wheels turns around a common turning center, to be used for explaining variables of the Ackermann-Jeantaud theory.

FIG. 2 is a planar schematic view of the vehicle in which each of the wheels WFL, WFR, WRL, WRR turns around a common turning center, to be used for explaining variables of the Ackermann-Jeantaud theory.

The Ackermann-Jeantaud theory is premised on an assumption that the turning centers of the four front and rear wheels WFL, WFR, WRL, WRR are located in the same point in such a manner that turning angles αr, αl of the steering wheels (front wheels WFL, WFR in this embodiment) when the vehicle turns are larger on the inner wheel side (right front wheel WFR side in an example of FIG. 2) than on the outer wheel side (left front wheel WFL side in the example of FIG. 2).

From a wheel base L and a tread E of the vehicle, a curve of the Ackermann-Jeantaud theory, as is well known in the art, is represented by a formula (1).

$$E/L=(1/\tan \alpha l)-(1/\tan \alpha r) \quad (1)$$

Herein, tan αl=L/Rrl, tan αr=L/Rrr.

According to the Ackermann-Jeantaud theory, as represented by a formula (2), the steering angle θ converted to a circumference of the steering shaft 14 is calculated based on the difference ωfl−ωfr between the wheel speeds of the left and right front wheels WFL, WFR. In other words, the estimated steering angle (to be referred to as a first estimated steering angle) θ1ƒ of each of the steering angles (also referred to as actual steering angle θact) of the front wheels WFL, WFR which are the steering wheels of the vehicle, is calculated based on the difference ωfl−ωfr between the wheel speeds of the left and right front wheels.

Further, as represented by a formula (3), the steering angle θ converted to the circumference of the steering shaft 14 is calculated based on the difference ωrl−ωrr between the wheel speeds of the left and right rear wheels WRL, WRR (difference between left and right rear wheel speeds). In other words, the estimated steering angle (to be referred to as a second estimated steering angle) θ2r of each of the steering angles (actual steering angle θact) of the front wheels WFL, WFR which are the steering wheels of the vehicle, is calculated based on the difference ωrl−ωrr between the wheel speeds of the left and right rear wheels.

$$\theta 1f=(1/2)\times\arcsin\ [(4L/E)\{(\omega fl-\omega fr)/(\omega fl+\omega fr)\}] \quad (2)$$

$$\theta 2r=\arctan\ [(2L/E)\{(\omega rl-\omega rr)/(\omega rl+\omega rr)\}] \quad (3)$$

Herein,

θ1f: First estimated steering angle (Estimated steering angle on the front wheel side)

θ2r: Second estimated steering angle (Estimated steering angle on the rear wheel side)

L: Wheel base

E: Tread

ωfl: Left front wheel speed

ωfr: Right front wheel speed

ωrl: Left rear wheel speed

ωrr: Right rear wheel speed

Figure 3A:
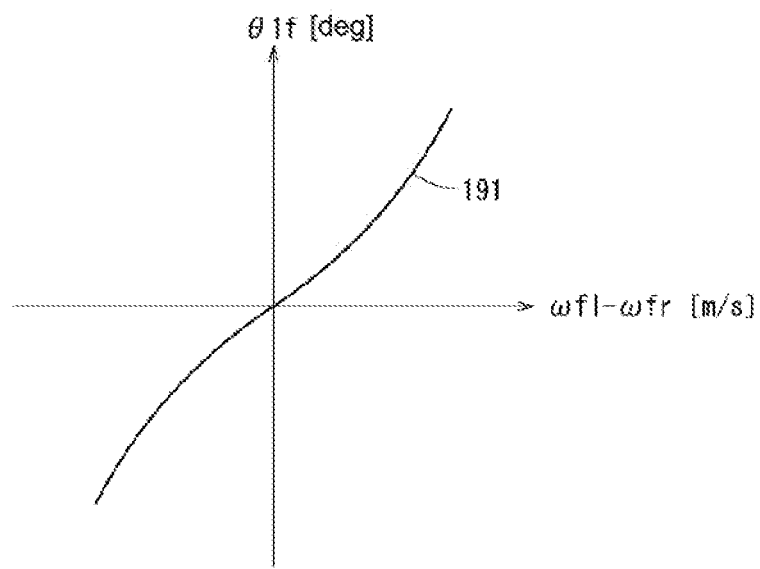
FIG. 3A is a characteristic diagram of a first estimated steering angle using a difference between wheel speeds of left and right front wheels as a variable.
Figure 3B:
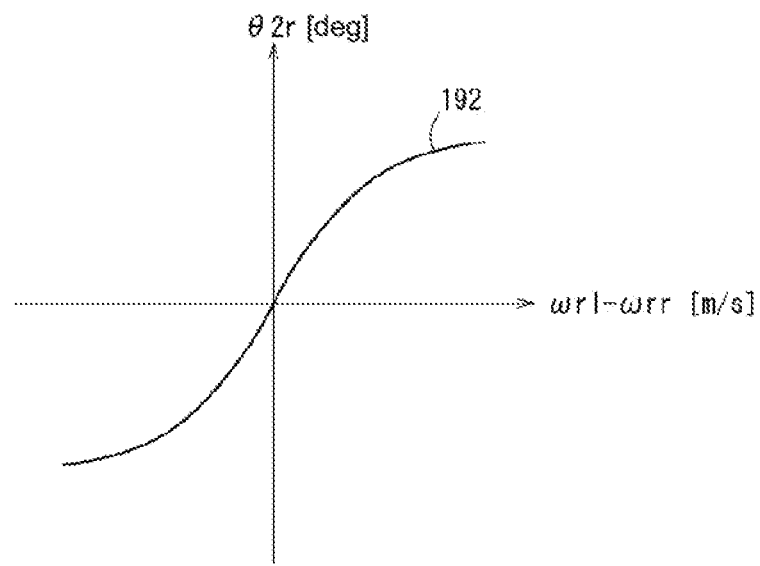
FIG. 3B is a characteristic diagram of a second estimated steering angle using a difference between wheel speeds of left and right rear wheels as a variable.

FIG. 3A shows a characteristic 191 of the first estimated steering angle θ1f using as a variable the difference ωfl−ωfr between the wheel speeds of the left and right front wheels which is obtained by a formula (2), and FIG. 3B shows a characteristic 192 of the second estimated steering angle θ2r using as a variable the difference ωrl−ωrr between the wheel speeds of the left and right rear wheels.

(ii) The estimated steering angle (first estimated steering angle θ1f) estimated from the front wheels WFL, WFR has good responsiveness to the actual steering angle θact of the vehicle since the difference ωfl−ωfr between the wheel speeds of the left and right front wheels is generated in concurrence with the operating (turning) of the steering handle 12.

(iii) In the front wheels WFL, WFR, the accuracy of the first estimated angle θ1f is heightened since the wheel turning angle is developed in concurrence with the turning whereby the value of the difference ωfl−ωfr between the wheel speeds of the left and right front wheels becomes larger.

Figure 4A:
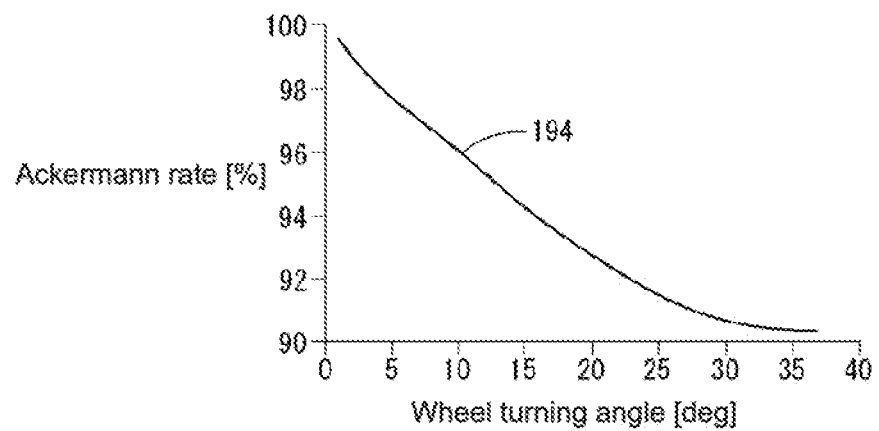
FIG. 4A is a characteristic diagram showing a change of an Ackermann rate relative to a wheel turning angle.
Figure 4B:
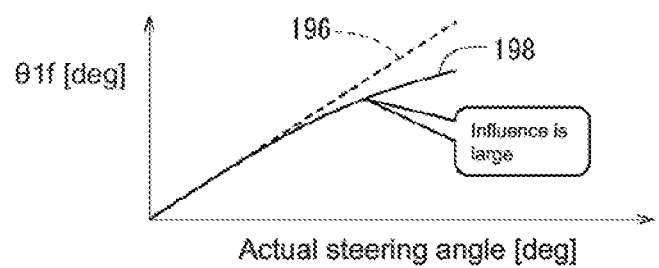
FIG. 4B is a diagram of assistance in explaining that the accuracy of the first estimated steering angle relative to an actual steering angle is deteriorated with a fall in the Ackermann rate.

(iv) However, as can be seen from a characteristic 194 (that differs depending on vehicle models) showing a change of an Ackermann value relative to the wheel turning angle in FIG. 4A, the front wheels WFL, WFR deviate with increase of the turning angle from the curve of the Ackermann theory under the influence of a suspension geometry (the Ackermann rate falls below). Therefore, as shown in FIG. 4B, the accuracy of the first estimated steering angle θ1f relative to the actual steering angle θact is lowered from a characteristic 196 shown by a dashed line to a characteristic 198 shown by a solid line as the Ackermann rate falls below.

Figure 5:
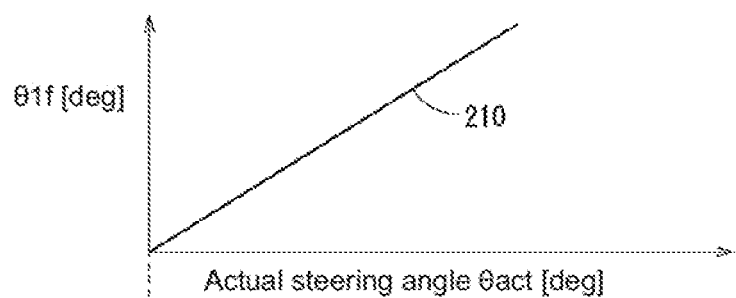
FIG. 5 is a diagram of assistance in explaining that an estimated steering angle on the rear wheel side relative to the actual steering angle is delayed more than an estimated steering angle on the front side relative to the actual steering angle at the time of turning.
Figure 5:
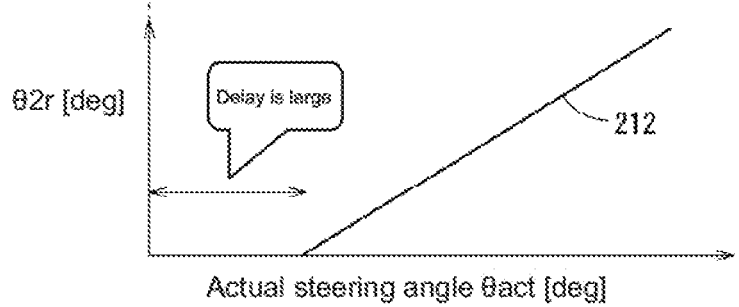

(v) As shown in FIG. 5, a characteristic 212 of the second estimated steering angle θ2r on the rear wheel side has responsiveness relative to the actual steering angle θact which is lower than that of a characteristic 210 of the first estimated steering angle θ1f (a response is delayed) since the difference ωrl−ωrr between the left and right rear wheel speeds ωrl, ωrr is generated after the turning is actually started.

(vi) The second estimated steering angle θ2r on the rear wheel side is lower in accuracy than the first estimated steering angle θ1f on the front wheel side since the difference ωrl−ωrr between the left and right rear wheel speeds ωrl, ωrr is generated in such a manner as to be dragged along by the turning of the vehicle.

Figure 6:
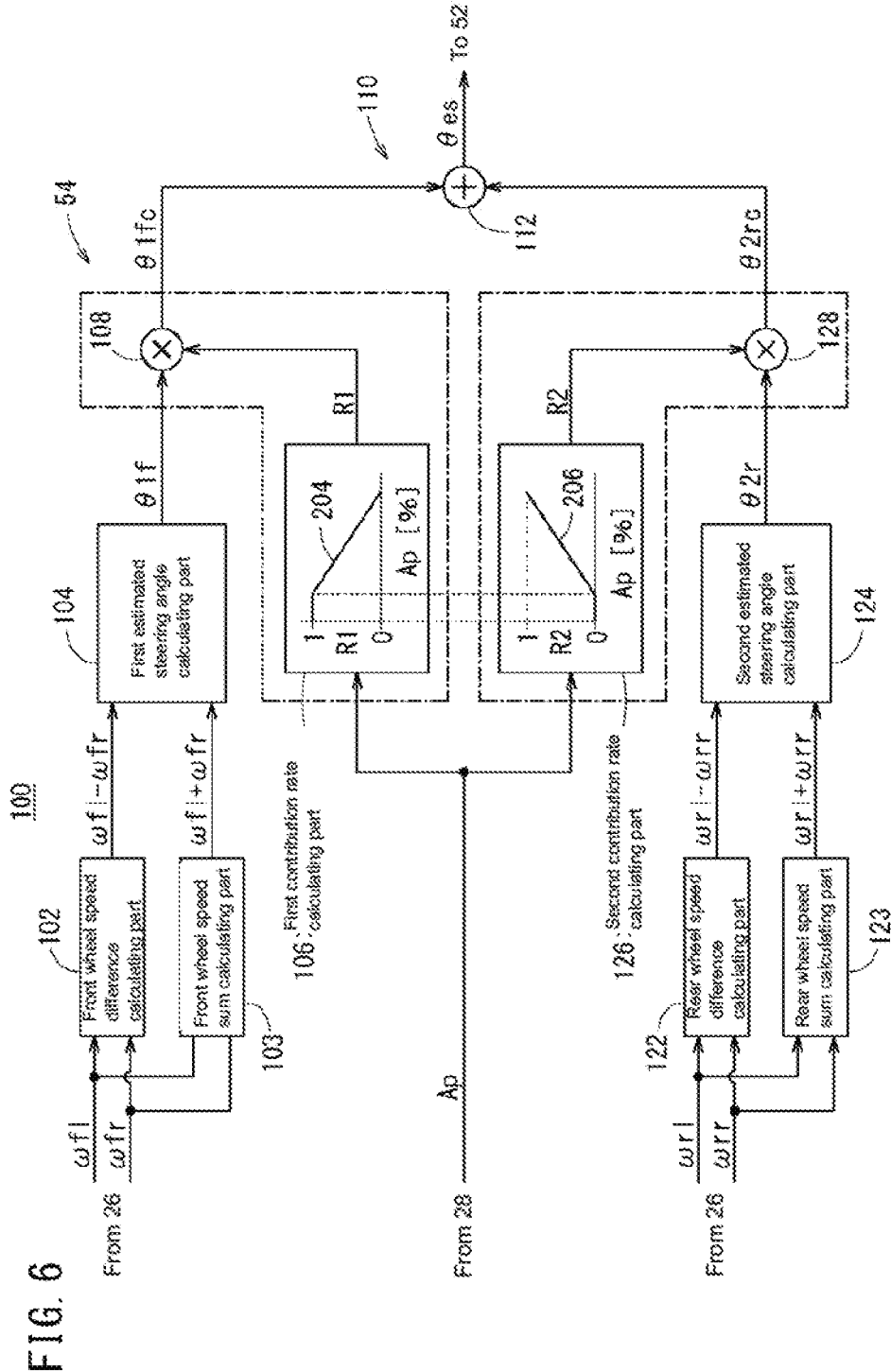
FIG. 6 is a block diagram showing a structure of an estimated steering angle calculation section forming an essential part of the estimated steering angle calculation device for the vehicle in accordance with the first embodiment.

FIG. 6 is a block diagram showing a structure of the estimated steering angle calculation section 54 forming an essential part of the estimated steering angle calculation device 100 for the vehicle in accordance with the first embodiment.

The estimated steering angle calculation section 54 includes a front wheel speed difference calculating part 102, a front wheel speed sum calculating part 103, a rear wheel speed difference calculating part 122, a rear wheel speed sum calculating part 123, a first estimated steering angle calculating part 104, a second estimated steering angle calculating part 124, the accelerator opening degree sensor 28 (see FIG. 1) and a weighting and combining part 110. These parts (or some of them) may be embodied by executing a computer program stored in a memory device with a CPU, or may be embodied by a hardware circuitry.

The weighting and combining part 110 is composed of a first contribution rate calculating part 106, a multiplier 108, a second contribution rate calculating part 126, a multiplier 128 and adder 112.

Next, the operation of the estimated steering angle calculation device 100 of the vehicle according to the first embodiment will be explained with reference to a flow chart of FIG. 7. Herein, a program execution subject with respect to the flow chart is a CPU (not shown) of the estimated steering angle calculation device 100.

During travelling of the vehicle, in a step S1, the wheel speeds ω of the four wheels (left front wheel speed ωfl, right front wheel speed ωfr, left rear wheel speed ωrl and right rear wheel speed ωrr) are detected and outputted by the wheel speed sensor 26 so as to be captured by the estimated steering angle calculation section 54.

In a step S2, the front wheel speed difference calculating part 102 calculates the difference ωfl−ωfr between the wheel speeds of the left and right front wheels WFL, WFR thereby to output it to the first estimated steering angle calculating part 104. Moreover, in the step S2, the front wheel speed sum calculating part 103 calculates the sum ωfl+ωfr of the wheel speeds of the left and right front wheels WFL, WFR thereby to output it to the first estimated steering angle calculating part 104. Further, in the step S2, the rear wheel speed difference calculating part 122 calculates the difference ωrl−ωrr between the wheel speeds of the left and right rear wheels WRL, WRR thereby to output it to the second estimated steering angle calculating part 124. Furthermore, in the step S2, the rear wheel speed sum calculating part 123 calculates the sum ωrl+ωrr of the wheel speeds of the left and right rear wheels WRL, WRR thereby to output it to the second estimated steering angle calculating part 124.

In a step S3, the accelerator opening degree Ap is detected by the accelerator opening degree sensor 28 and captured into the first contribution rate calculating part 106 and the second contribution rate calculating part 126.

In a step S4, the first estimated steering angle calculating part 104 calculates the first estimated steering angle θ1f based on the formula (2). The second estimated steering angle calculating part 124 calculates the second estimated steering angle θ2r based on the formula (3).

In a step S5, the first contribution rate calculating part 106 refers to the characteristic 204 (characteristic curve or map) based on the accelerator opening degree Ap thereby to calculate a first contribution rate R1, and the second contribution rate calculating part 126 refers to the characteristic 206 (characteristic curve or map) based on the accelerator opening rate Ap thereby to calculate a second contribution rate R2. In this embodiment, the relationship between the first contribution rate R1 and the second contribution rate R2 is R1+R2=1 (100[%]).

In a step S6, the first estimated steering angle θ1f is multiplied by the first contribution rate R1 by the multiplier 108 thereby to calculate a first contributory portion estimated steering angle θ1fc (θ1fc=θ1f×R1) after correction. Further, the second estimated steering angle θ2r is multiplied by the second contribution rate R2 by the multiplier 128 thereby to calculate a second contributory portion estimated steering angle θ2rc {θ2rc=θ2r×R2=θ2rx(1−R1)} after correction.

In a step S7, the first contributory portion estimated steering angle θ1fc and the second contributory portion estimated steering angle θ2rc are added together by the adder 112 thereby to calculate the estimated steering angle θes (θes=θ1fc+θ2rc) of the vehicle.

The estimated steering angle calculation device 100 of the vehicle according to the first embodiment operates in such a way as referred to above, whereby the estimated steering angle θes is calculated and outputted to the EPS reaction force control section 52.

Hereinafter, the operation of the electric power steering device 10 will be explained briefly. The EPS reaction force control section 52 is configured to find the behavior of the vehicle (the turning direction, the slipping wheel, the generation of the understeer, the generation of the oversteer and the like) based on the vehicle speed Vs, the wheel speed ω, the estimated steering angle θes and each of the outputs of the yaw rate sensor 58 and the lateral acceleration sensor (not shown), and to calculate the correction assist current value Icor for decreasing the reaction force added to the steering handle 12 in the direction to be turned by the driver and increasing the reaction force in the opposite direction, thereby to supply it to the other terminal of the adder 55.

Further, a turning radius RF of the vehicle is calculated by the estimated steering angle θes (see FIG. 2, the estimated steering angle θes is substituted for a function Rf=Rf(θes) which is found in advance for each vehicle model by using the estimated steering angle θes as a variable) whereby the circumference 2π·Rf of a circle is calculated. The time required for making a round of the circumference 2πRf is calculated by dividing the circumference 2π·Rf [m] by the vehicle speed Vs [m/s].

Accordingly, an estimated yaw rate Yres is calculated by the following formula (4), and the behavior of the vehicle can be found by comparing the estimated yaw rate Yres with the yaw rate (actual yaw rate) Yr which is outputted from the yaw rate sensor 58.

$$Yres=360\ [deg]/2\pi Rf\ [m]/Vs\ [m/s]=(360\cdot Vs/2\pi Rf)\ [deg/s] \quad (4)$$

[Summary of the First Embodiment]

The estimated steering angle calculation device 100 for the vehicle according to the above first embodiment comprises the front wheel speed difference calculating part 102 for detecting each of the wheel speeds ωfl, ωfr of the left and right front wheels WFL, WFR of the vehicle and calculating the front wheel speed difference ωfl−ωfr between the left and right front wheels WFL, WFR, the rear wheel speed difference calculating part 122 for detecting each of the wheel speeds ωrl, ωrr of the left and right rear wheels WRL, WRR of the vehicle and calculating the rear wheel speed difference ωrl−ωrr between the left and right rear wheels WRL, WRR, the first estimated steering angle calculating part 104 for calculating the first estimated steering angle θ1f based on the front wheel speed difference ωfl−ωfr, the second estimated steering angle calculating part 124 for calculating the second estimated steering angle θ2r based on the rear wheel speed difference ωrl−ωrr, the accelerator opening degree sensor 28 for detecting the accelerator opening degree Ap of the vehicle, and the estimated steering angle calculation section 54 for calculating the estimated steering angle θes of the vehicle.

Herein, the estimated steering angle calculation section 54 calculates the first contributory portion estimated steering angle θ1fc which is the contributory portion of the first estimated steering angle θ1f to the estimated steering angle θes of the vehicle, based on the accelerator opening degree Ap, and also calculates the second contributory portion estimated steering angle θ2rc which is the contributory portion of the second estimated steering angle θ2r to the estimated steering angle θes of the vehicle, based on the accelerator opening degree Ap, and the estimated steering angle θes of the vehicle is calculated by combining the first contributory portion estimated steering angle θ1fc and the second contributory portion estimated steering angle θ2rc by the adder 112.

According to the estimated steering angle calculation device 100 of the first embodiment, since the first estimated steering angle θ1f on the side of the front wheels WFL, WFR and the second estimated steering angle θ2r on the side of the rear wheels WRL, WRR are weighted and combined based on the accelerator opening degree Ap thereby to calculate the estimated steering angle θes, it is possible to suppress the estimation error of the estimated steering angle θes due to the disturbance of the wheel speed ω (ωfl, ωfr, ωrl, ωrr) attributable to the wheel slip (idle running) at the time of sudden acceleration.

Actually, when being accelerated during turning, the driving force of the front wheels WFL, WFR serving as a drive wheel increases and the front wheel speed difference ωfl−ωfr which is the difference between the wheel speeds ωfl, ωfr of the left and right front wheels WFL, WFR decreases, so that the estimated steering angle θes tends to become smaller than the actual steering angle θact. In this case, the second contribution rate R2 on the side of the rear wheels WRL, WRR to the estimated steering angle θes is increased and the first contribution rate R1 on the side of the front wheels WFL, WFR is decreased in response to the accelerator opening degree Ap, so that the estimation error due to this tendency can be suppressed.

In this case, the estimated steering angle calculation device 100, as indicated by the characteristic 204 illustrated in a block of the first contribution rate calculating part 106 in FIG. 6, is configured such that the first contribution rate R1 is decreased and the first contributory portion estimated steering angle θ1fc corresponding to the contributory portion of the first estimated steering angle θ1f on the side of the front wheels WFL, WFR is decreased with increase of the accelerator opening degree Ap. On the other hand, as indicated by the characteristic 206 illustrated in a block of the first contribution rate calculating part 126, the second contributory portion estimated steering angle θ2rc corresponding to the contributory portion of the second estimated steering angle θ2r on the side of the rear wheels WRL, WRR is increased with increase of the accelerator opening degree Ap.

Therefore, the sudden change (violent movement) of the estimated steering angle θes which is the control output value attributable to the tire slip of the front wheels WFL, WFR at the time of sudden acceleration can be prevented.

Similarly, although the inner wheel (right front wheel WFR in FIG. 2) side having a lower load is easy to slip (idle running) at the time of turning by sudden acceleration so that there is a possibility of becoming the estimated steering angle θes of an opposite phase to that of the actual steering angle θact, it is possible to suppress the steering angle estimation error due to this possibility.

Further, although the sudden acceleration during straight travelling is easily led to the steering angle estimation error under the influence of external disturbance such as friction factor of a road and the like due to deterioration in tire gripping force of the front wheels WFL, WFR, this steering angle estimation error also can be suppressed.

As explained above, in the estimated steering angle calculation device 100 according to this first embodiment, at the time of generation of the tire slip or deterioration of the tire gripping force of the front wheels WFL, WFR, the first estimated steering angle θ1f based on the front wheels WFL, WFR is not completely shifted to the second estimated steering angle θ2r, and the first estimated steering angle θ1f on the side of the front wheels WFL, WFR and the second estimated steering angle θ2r on the side of the rear wheels WRL, WRR are weighted and combined based on the accelerator opening degree Ap. Further, when being combined together, as explained with reference to the characteristics 204, 206 in FIG. 6, the weighting (the first contribution rate R1 and the second contribution rate R2) is gradually shifted from the front wheel WFL, WFR side to the rear wheel WRL, WRR side with increase of the accelerator opening degree Ap. Therefore, the responsiveness and accuracy of the estimated steering angle θes can be made compatible. In addition, since the weighting is shifted gradually, the sudden change (violent movement) of the estimated steering angle θes which is the control output value can be prevented.

Actually, the optimum values of the characteristics 204, 206 are determined in accordance with the vehicle models. In the case where the accelerator opening degree AP is Ap=20[%] for example, the estimated steering angle θes is θes=θ1f×0.8 (=R1)+θ2rc×0.2 (=R2), and in the case where the accelerator opening degree Ap is Ap=80[%] for example, the estimated steering angle θes is θes=θ1f×0.2 (=R1)+θ2rc×0.8 (=R2).

[Modified Example of the First Embodiment]

Figure 8:
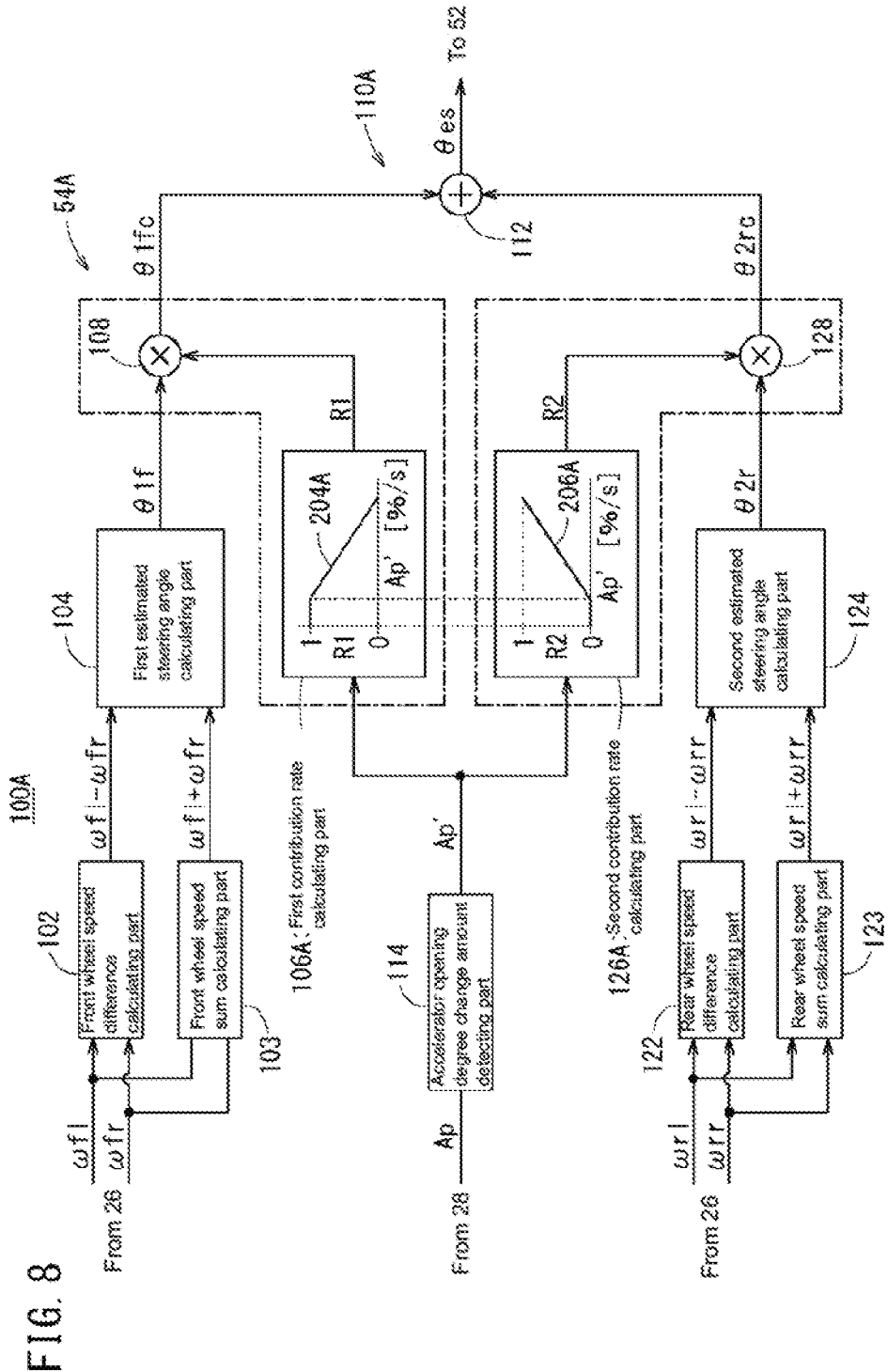
FIG. 8 is a block diagram showing a structure of the estimated steering angle calculation section forming an essential part of the estimated steering angle calculation device for the vehicle in accordance with the modified example of the first embodiment.

FIG. 8 is a block diagram showing a structure of an estimated steering angle calculation section 54A forming an essential part of an estimated steering angle calculation device 100A for the vehicle in accordance with the modified example of the first embodiment. Herein, an electric power steering device in which the estimated steering angle calculation device 100A is installed is referred to as an electric power steering device 10A (see FIG. 1).

The estimated steering angle calculation device 100A differs from the estimated steering angle calculation device 100 in that it is provided with an accelerator opening degree change amount detecting part 114.

The accelerator opening degree change amount detecting part 114 calculates (detects) a time change amount (to be referred also to as accelerator opening degree change amount or accelerator opening degree differential value) Ap'=dAp/dt [%/s] of the accelerator opening degree Ap detected by the accelerator opening degree sensor 28 thereby to output it as a variable to first and second contribution rate calculating parts 106A, 126A.

The change amount Ap' of the accelerator opening degree is used as a variable for characteristics 204A, 206A of the first and second contribution rate calculating parts 106A, 126A.

Figure 7:
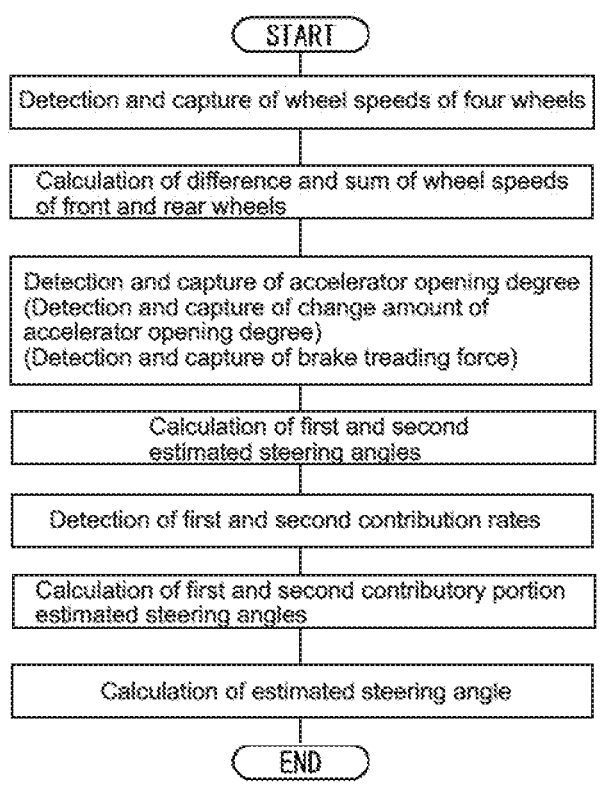
FIG. 7 is a flow chart to be used for explaining the operation of the estimated steering angle calculation device for the vehicle in accordance with the first embodiment, a modified example of the first embodiment and a second embodiment.

The operation of the estimated steering angle calculation device 100A for the vehicle according to this modified example of the first embodiment differs only in that the change amount Ap' of the accelerator opening degree is calculated (detected) at the time of detecting the accelerator opening degree Ap in the step S3 of the above referred flow chart of FIG. 7. Therefore, the operation will be explained briefly while quoting the flow chart of FIG. 7.

The estimated steering angle calculation device 100A for the vehicle according to the modified example of the first embodiment comprises the front wheel speed difference calculating part 102 for detecting each of the wheel speeds ωfl, ωfr of the left and right front wheels WFL, WFR of the vehicle (step S1) and calculating the front wheel speed difference ωfl−ωfr between the left and right front wheels WFL, WFR (step S2), the rear wheel speed difference calculating part 122 for detecting each of the wheel speeds ωrl, ωrr of the left and right rear wheels WRL, WRR of the vehicle (step S1) and calculating the rear wheel speed difference ωrl−ωrr between the left and right rear wheels WRL, WRR (step S2), the first estimated steering angle calculating part 104 for calculating the first estimated steering angle θ1f based on the front wheel speed difference ωfl−ωfr (step S4), the second estimated steering angle calculating part 124 for calculating the second estimated steering angle θr based on the rear wheel speed difference ωrl−ωrr (step S4), the accelerator opening degree change amount detecting part 114 for detecting a change amount Ap' of the accelerator opening degree of the vehicle (step S3), and the estimated steering angle calculation section 54A for calculating the estimated steering angle θes of the vehicle.

Herein, the estimated steering angle calculation section 54A is configured to calculate the first contribution rate R1 while referring to the characteristic 204A based on the change amount Ap' of the accelerator opening degree and further calculate the first contributory portion estimated steering angle θ1fc (θ1fc=θ1f×R1) which is the contributory portion of the first estimated steering angle θ1f to the estimated steering angle θes of the vehicle (steps S5, S6). Moreover, the estimated steering angle calculation section is configured to calculate the second contribution rate R2 while referring to the characteristic 206A based on the change amount Ap' of the accelerator opening degree and further calculate the second contributory portion estimated steering angle θ2rc (θ2rc=θ2r×R2) which is the contributory portion of the second estimated steering angle θ2r to the estimated steering angle θes of the vehicle, (steps S5, S6). The estimated steering angle θes (θes=θ1fc+θ2rc) of the vehicle is calculated by combining the first contributory portion estimated steering angle θ1fc and the second contributory portion estimated steering angle θ2rc by the adder 112 (step S7).

According to the estimated steering angle calculation device 100A of the modified example of the first embodiment, since the first estimated steering angle θ1f on the side of the front wheels WFL, WFR and the second estimated steering angle θ2r on the side of the rear wheels WRL, WRR are weighted and combined based on the change amount Ap' of the accelerator opening degree thereby to calculate the estimated steering angle θes, it is possible to suppress the estimation error of the estimated steering angle θes due to the disturbance of the wheel speed ((ωfl, ωfr, ωrl, ωrr) attributable to the tire slip at the time of sudden acceleration.

Actually, when being accelerated during turning, the driving force of the front wheels WFL, WFR serving as a drive wheel increases and the front wheel speed difference ωfl−ωfr which is the difference between the wheel speeds ωfl, ωfr of the left and right front wheels WFL, WFR decreases, so that the estimated steering angle θes tends to become smaller than the actual steering angle θact. In this case, the second contribution rate R2 to the estimated steering angle θes on the side of the rear wheels WRL, WRR is increased and the first contribution rate R1 on the side of the front wheels WFL, WFR is decreased in response to the accelerator opening degree Ap, so that the estimation error due to this tendency can be suppressed.

In this case, the estimated steering angle calculation device 100A, as indicated by the characteristic 204A illustrated in a block of the first contribution rate calculating part 106A in FIG. 8, is configured such that the first contributory portion estimated steering angle θ1fc corresponding to the contributory portion of the first estimated steering angle θ1f on the side of the front wheels WFL, WFR is decreased with increase of the change amount Ap' of the accelerator opening degree. On the other hand, as indicated by the characteristic 206A illustrated in a block of the second contribution rate calculating part 126A, the second contributory portion estimated steering angle θ2rc corresponding to the contributory portion of the second estimated steering angle θ2r on the side of the rear wheels WRL, WRR is increased with increase of the change amount Ap' of the accelerator opening degree. Therefore, the sudden change (violent movement) of the estimated steering angle θes which is the control output value attributable to the tire slip of the front wheels WFL, WFR at the time of sudden acceleration can be prevented.

Similarly, although the inner wheel side having a lower load is easy to slip (idle running) at the time of turning by sudden acceleration so that there is a possibility of becoming the estimated steering angle θes of an opposite phase to that of the actual steering angle θact, it is possible to suppress the steering angle estimation error due to this possibility.

Further, although the sudden acceleration during straight travelling is easily led to the steering angle estimation error under the influence of external disturbance such as friction factor of a road and the like due to deterioration in tire gripping force of the front wheels WFL, WFR, this steering angle estimation error also can be suppressed.

As explained above, in the estimated steering angle calculation device 100A according to this modified example of the first embodiment, at the time of the tire slip or deterioration of the tire gripping force on the front wheel WFL, WFR side, the first estimated steering angle θ1f on the front wheel WFL, WFR side is not completely shifted to the second estimated steering angle θ2r, and the first estimated steering angle θ1f on the side of the front wheels WFL, WFR and the second estimated steering angle θ2r on the side of the rear wheels WRL, WRR are weighted and combined in accordance with the change amount Ap' of the accelerator opening degree. Further, when being combined together, as explained with reference to the characteristics 204A, 206A in FIG. 8, the weighting (the first contribution rate R1 and the second contribution rate R2) is gradually shifted from the front wheel WFL, WFR side to the rear wheel WRL, WRR side in accordance with the change amount Ap' of the accelerator opening degree. Therefore, the responsiveness and accuracy of the estimated steering angle θes can be made compatible. In addition, since the weighting is shifted gradually, the sudden change (violent movement) of the estimated steering angle θes which is the control output value can be prevented.

Actually, the optimum values of the characteristics 204A, 206A are determined in accordance with the vehicle models. In the case where the change amount Ap' of the accelerator opening degree is Ap'=20 [%/s] for example, the estimated steering angle θes is θes=θ1f×0.8 (=R1)+θ2rc×0.2 (=R2), and in the case where the change amount Ap' of the accelerator opening degree is Ap'=80 [%/s] for example, the estimated steering angle θes is θes=θ1f×0.2 (=R1)+θ2rc×0.8 (=R2).

[Second Embodiment]

Figure 9:
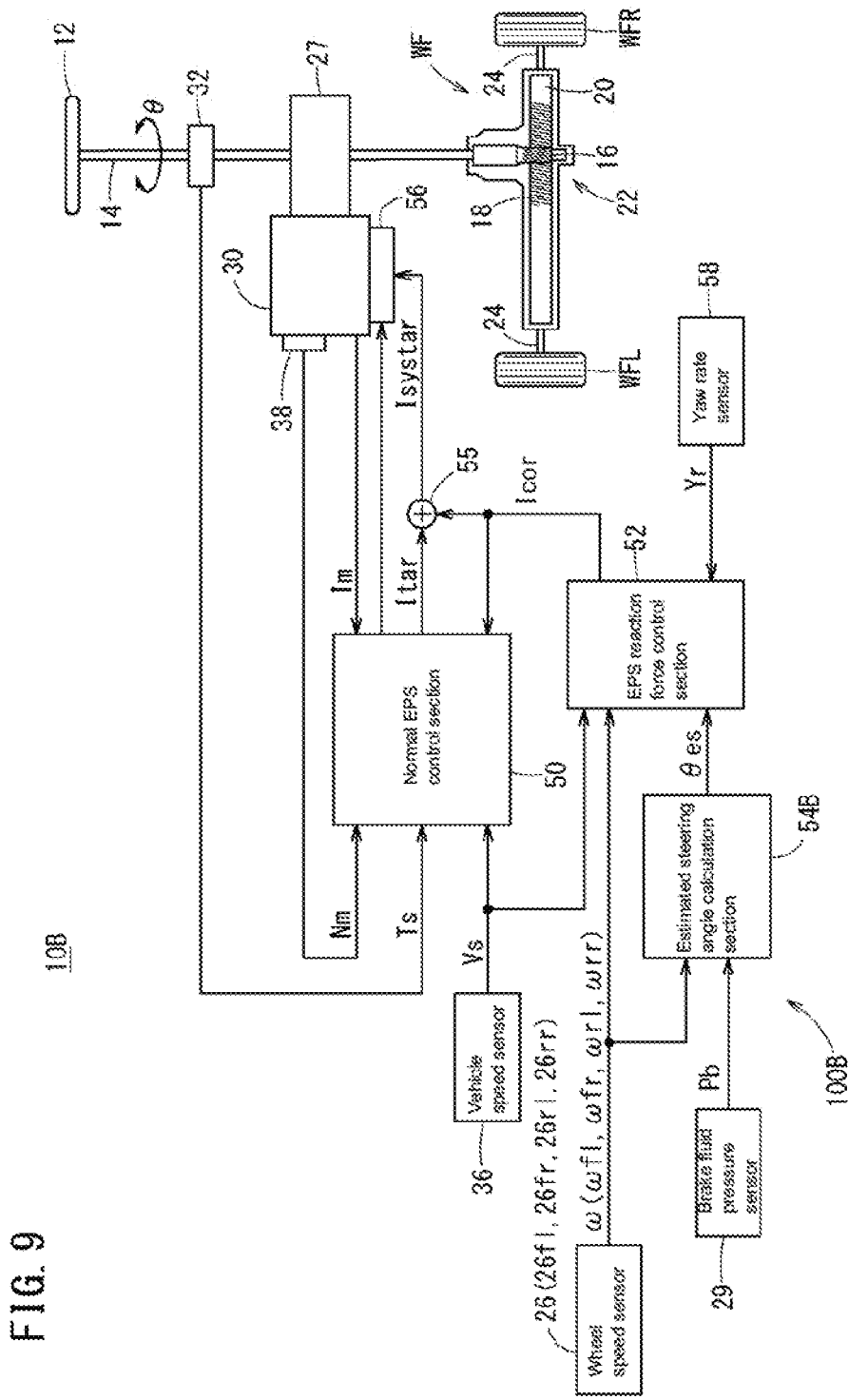
FIG. 9 is a schematic configuration diagram of the electric power steering device in which the estimated steering angle calculation device for the vehicle in accordance with the second embodiment of the present disclosure is installed.

FIG. 9 is a schematic configuration diagram of an electric power steering device (EPS device) 10B in which an estimated steering angle calculation device 100B for the vehicle in accordance with the second embodiment of the present disclosure is installed.

Figure 10:
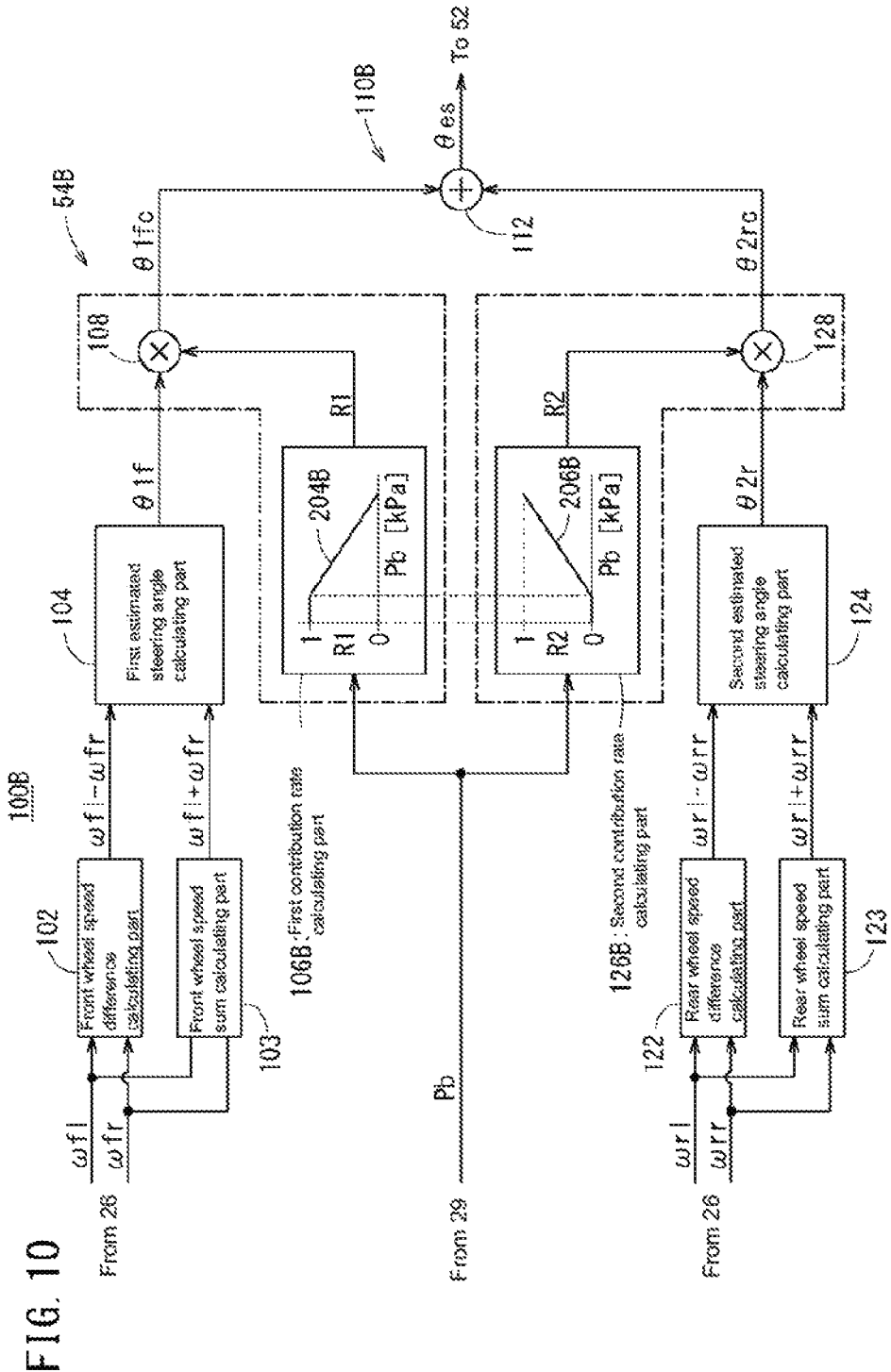
FIG. 10 is a block diagram showing a structure of the estimated steering angle calculation section forming an essential part of the estimated steering angle calculation device for the vehicle in accordance with the second embodiment.

FIG. 10 is a block diagram showing a structure of an estimated steering angle calculation section 54B forming an essential part of the estimated steering angle calculation device 100B for the vehicle in accordance with the second embodiment.

With respect to component elements shown in FIGS. 9 and 10, like component elements are given like reference characters shown in FIGS. 1 and 2, and the detailed description will be omitted.

In FIGS. 9 and 10, a brake fluid pressure sensor 29 is substituted for the accelerator opening degree sensor 28 of FIG. 1. The brake fluid pressure sensor 29 is provided in a master cylinder (not shown) and configured to detect treading force (brake treading force) of a brake pedal (not shown) by the driver, etc. as the brake fluid pressure (hereinafter referred also to as brake dreading force) Pb [kPa] thereby to output it to a first contribution rate calculating part 106B (FIG. 10) and a second contribution rate calculating part 126B (FIG. 10) which constitute the estimated steering angle calculation section 54B (FIG. 9).

The brake treading force is used as a variable for characteristics 204B, 206B of the first and second contribution rate calculating parts 106B, 126B.

The operation of the estimated steering angle calculation device 100B for the vehicle according to this second embodiment differs only in that the brake treading force Pb is detected instead of detecting the accelerator opening degree Ap in the step S3 of the above referred flow chart of FIG. 7. Therefore, the operation will be explained briefly while quoting the flow chart of FIG. 7.

The estimated steering angle calculation device 100B for the vehicle according to the second embodiment comprises the front wheel speed difference calculating part 102 for detecting each of the wheel speeds ωfl, ωfr of the left and right front wheels WFL, WFR of the vehicle (step S1) and calculating the front wheel speed difference ωfl−ωfr between the left and right front wheels WFL, WFR (step S2), the rear wheel speed difference calculating part 122 for detecting each of the wheel speeds ωrl, ωrr of the left and right rear wheels WRL, WRR of the vehicle (step S1) and calculating the rear wheel speed difference ωrl−ωrr between the left and right rear wheels WRL, WRR (step S2), the first estimated steering angle calculating part 104 for calculating the first estimated steering angle θ1f based on the front wheel speed difference ωfl−ωfr (step S4), the second estimated steering angle calculating part 124 for calculating the second estimated steering angle θ2r based on the rear wheel speed difference ωrl−ωrr (step S4), the brake fluid pressure sensor 29 serving as a brake treading force detecting part for detecting the brake treading force (brake fluid pressure) Pb of the vehicle (step S3), and the estimated steering angle calculation section 54B for calculating the estimated steering angle θes of the vehicle.

The estimated steering angle calculation section 54B is configured to calculate the first contribution rate R1 while referring to the characteristic 204B based on the brake treading force Pb (step S5) and further calculate the first contributory portion estimated steering angle θ1fc (θ1fc=θ1f×R1) which is the contributory portion of the first estimated steering angle θ1f to the estimated steering angle θes of the vehicle (step S6). Moreover, the estimated steering angle calculation section is configured to calculate the second contribution rate R2 while referring to the characteristic 206B based on the brake treading force Pb (step S5) and further calculate the second contributory portion estimated steering angle θ2rc (θ2rc=θ2r×R2) which is the contributory portion of the second estimated steering angle θ2r to the estimated steering angle θes of the vehicle (step S6). The estimated steering angle θes (θes=θ1fc+θ2rc) of the vehicle is calculated by combining the first contributory portion estimated steering angle θ1fc and the second contributory portion estimated steering angle θ2rc by the adder 112 (step S7).

According to the estimated steering angle calculation device 100B of the second embodiment, since the first estimated steering angle θ1f on the side of the front wheels WFL, WFR side and the second estimated steering angle θ2r on the side of the rear wheels WRL, WRR are weighted and combined based on the brake treading force Pb thereby to calculate the estimated steering angle θes, it is possible to suppress the estimation error of the estimated steering angle θes due to the disturbance of the wheel speed ω (ωfl, ωfr, ωrl, ωrr) attributable to the wheel lock, etc. at the time of sudden deceleration.

Actually, when being decelerated during turning, the tires of the front wheels WFL, WFR tends to be locked and the front wheel speed difference ωfl−ωfr which is the difference between the wheel speeds ωfl, ωfr of the left and right front wheels decreases, so that the estimated steering angle θes tends to become smaller than the actual steering angle θact. In this case, the second contribution rate R2 to the estimated steering angle θes on the side of the rear wheels WRL, WRR is increased and the first contribution rate R1 on the side of the front wheels WFL, WFR is decreased in accordance with the brake treading force Pb, so that the estimation error due to this tendency can be suppressed.

In this case, the estimated steering angle calculation device 100B, as indicated by the characteristic 204B illustrated in a block of the first contribution rate calculating part 106B in FIG. 8, is configured such that the first contribution rate R1 is decreased and the contributory portion estimated steering angle θ1fc corresponding to the contributory portion of the first estimated steering angle θ1f on the side of the front wheels WFL, WFR is decreased with increase of the brake treading force Pb. On the other hand, as indicated by the characteristic 206B illustrated in a block of the second contribution rate calculating part 126B, the second contributory portion estimated steering angle θ2rc corresponding to the contributory portion of the second estimated steering angle θ2r on the side of the rear wheels WRL, WRR is increased with increase of the brake treading force. Therefore, the sudden change (violent movement) of the estimated steering angle θes which is the control output value attributable to the tire lock or shimmy (shaking) on the side of the front wheels WFL, WFR at the time of sudden deceleration can be prevented.

Similarly, although the inner wheel side having a lower load is easy to be locked at the time of turning by sudden deceleration so that there is a possibility of becoming the excessive estimated steering angle θes relative to the actual steering angle θact, it is possible to suppress the steering angle estimation error due to this possibility.

To put it briefly, in the estimated steering angle calculation device 100B according to the second embodiment, at the time of generation of the tire lock or shimmy of the on the front wheel WFL, WFR side, the first estimated steering angle θ1f on the front wheel WFL, WFR side is not completely shifted to the second estimated steering angle θ2r, and the first estimated steering angle θ1f on the side of the front wheels WFL, WFR and the second estimated steering angle θ2r on the side of the rear wheels WRL, WRR are weighted and combined in accordance with the brake treading force Pb. Further, when being combined together, the weighting is gradually shifted from the front wheel WFL, WFR side to the rear wheel WRL, WRR side in accordance with the brake treading force Pb. Therefore, the responsiveness and accuracy of the estimated steering angle θes can be made compatible. In addition, since the weighting is shifted gradually, the sudden change (violent movement) of the estimated steering angle θes which is the control output value can be prevented.

Actually, the optimum values of the characteristics 204B, 206B are determined in accordance with the vehicle models. In the case where the brake treading force Pb is Pb=20 [%] for example, the estimated steering angle θes is θes=θ1f× 0.8+θ2rc×0.2, and in the case where the brake treading force is Pb=80 [%] for example, the estimated steering angle θes is θes=θ1f×0.2+θ2rc×0.8.

The present invention is not limited to the above explained embodiments, and, as will be explained in the following (a), (b), (c), etc. for example, various configurations may be adopted based on the description of the specification.

(a) The estimated steering angle θes may be calculated based on a change amount (differential value dPb/dt) of the brake treading force Pb, instead of the brake treading force Pb.

(b) The estimated steering angle calculation device 100 (FIG. 6), 100A (FIG. 8), 100B (FIG. 10) is installed in the vehicle provided with a steering angle sensor and is used as a redundant system of the steering angle sensor (i. an alternate device when failure of the steering angle sensor has been detected, ii. failure detection of the steering angle sensor by comparison with the steering angle to be detected by the steering angle sensor) whereby to improve the reliability still further.

(c) Although, in the above embodiments, the accelerator opening degree Ap is the opening degree of the throttle (throttle valve) to be controlled by the operation of the accelerator pedal (not shown), the present invention is not limited to the internal combustion engine vehicle but may be applied to an electric motor vehicle (including a fuel cell vehicle), etc. in which the driving torque of the motor (not shown) is controlled based on the operation of the accelerator pedal (not shown). Moreover, it may be applied also to an automatic operative vehicle in which the accelerator opening degree Ap is automatically controlled. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An estimated steering angle calculation device for a vehicle comprising:
a front wheel speed difference calculating controller for detecting each of wheel speeds of left and right front wheels of the vehicle and calculating a front wheel speed difference between the left and right front wheels;
a rear wheel speed difference calculating controller for detecting each of wheel speeds of left and right rear wheels of the vehicle and calculating a rear wheel speed difference between the left and right rear wheels;
a first estimated steering angle calculating controller for calculating a first estimated steering angle using the front wheel speed difference;
a second estimated steering angle calculating controller for calculating a second estimated steering angle using the rear wheel speed difference;
an accelerator opening degree sensor for detecting an accelerator opening degree of the vehicle; and
an estimated steering angle calculation controller for calculating an estimated steering angle of the vehicle;
wherein the estimated steering angle calculation controller:
calculates a first weighted estimated steering angle which is a weighted value of the first estimated steering angle weighted based on the accelerator opening degree,
calculates a second weighted estimated steering angle which is a weighted value of the second estimated steering angle weighted based on the accelerator opening degree, and
calculates the estimated steering angle of the vehicle by combining the first weighted estimated steering angle and the second weighted estimated steering angle.

2. The estimated steering angle calculation device for the vehicle according to claim 1, wherein the estimated steering angle calculation controller is configured to decrease the first weighted estimated steering angle and increase the second weighted estimated steering angle with increase of the accelerator opening degree.

3. An estimated steering angle calculation device for a vehicle comprising:
a front wheel speed difference calculating controller for detecting each of wheel speeds of left and right front wheels of the vehicle and calculating a front wheel speed difference between the left and right front wheels;
a rear wheel speed difference calculating controller for detecting each of wheel speeds of left and right rear wheels of the vehicle and calculating a rear wheel speed difference between the left and right rear wheels;
a first estimated steering angle calculating controller for calculating a first estimated steering angle using the front wheel speed difference;
a second estimated steering angle calculating controller for calculating a second estimated steering angle using the rear wheel speed difference;
an accelerator opening degree change amount detecting controller for detecting a change amount of an accelerator opening degree of the vehicle; and
an estimated steering angle calculation controller for calculating an estimated steering angle of the vehicle;
wherein the estimated steering angle calculation controller:
calculates a first weighted estimated steering angle which is a weighted value of the first estimated steering angle weighted based on the change amount of the accelerator opening degree,
calculates a second weighted estimated steering angle which is a weighted value of the second estimated steering angle weighted based on the change amount of the accelerator opening degree, and calculates the estimated steering angle of the vehicle by combining the first weighted estimated steering angle and the second weighted estimated steering angle.

4. The estimated steering angle calculation device for the vehicle according to claim 3, wherein the estimated steering angle calculation controller is configured to decrease the first weighted estimated steering angle and increase the second weighted estimated steering angle with increase of the change amount of the accelerator opening degree.

5. An estimated steering angle calculation device for a vehicle comprising:
   a front wheel speed difference calculating controller for detecting each of wheel speeds of left and right front wheels of the vehicle and calculating a front wheel speed difference between the left and right front wheels;
   a rear wheel speed difference calculating controller for detecting each of wheel speeds of left and right rear wheels of the vehicle and calculating a rear wheel speed difference between the left and right rear wheels;
   a first estimated steering angle calculating controller for calculating a first estimated steering angle using the front wheel speed difference;
   a second estimated steering angle calculating controller for calculating a second estimated steering angle using the rear wheel speed difference;
   a brake treading force detector for detecting brake treading force of the vehicle; and
   an estimated steering angle calculation controller for calculating an estimated steering angle of the vehicle;
   wherein the estimated steering angle calculation controller:
   calculates a first weighted estimated steering angle which is a weighted value of the first estimated steering angle weighted based on the brake treading force,
   calculates a second weighted estimated steering angle which is a weighted value of the second estimated steering angle weighted based on the brake treading force, and
   calculates the estimated steering angle of the vehicle by combining the first weighted estimated steering angle and the second weighted estimated steering angle.

6. The estimated steering angle calculation device for a vehicle according to claim 5, wherein the estimated steering angle calculation controller is configured to decrease the first weighted estimated steering angle and increase the second weighted estimated steering angle with increase of the brake treading force.

7. The estimated steering angle calculation device for the vehicle according to claim 1, wherein the estimated steering angle calculation controller is configured to
   obtain a first contribution rate of the first estimated steering angle and a second contribution rate of the second estimated steering angle, and
   change the first contribution rate and the second contribution rate in accordance with the accelerator opening degree.

8. The estimated steering angle calculation device for the vehicle according to claim 3, wherein the estimated steering angle calculation controller is configured to
   obtain a first contribution rate of the first estimated steering angle and a second contribution rate of the second estimated steering angle, and
   change the first contribution rate and the second contribution rate in accordance with the change amount of the accelerator opening degree.

9. The estimated steering angle calculation device for the vehicle according to claim 5, wherein the estimated steering angle calculation controller is configured to
   obtain a first contribution rate of the first estimated steering angle and a second contribution rate of the second estimated steering angle, and
   change the first contribution rate and the second contribution rate in accordance with the brake treading force.

10. The estimated steering angle calculation device for the vehicle according to claim 7, wherein the following equation is satisfied:

$$R1+R2=1\ (100[\%]),$$

wherein R1 is the first contribution rate and R2 is the second contribution rate.

11. The estimated steering angle calculation device for the vehicle according to claim 8, wherein the following equation is satisfied:

$$R1+R2=1\ (100[\%]),$$

wherein R1 is the first contribution rate and R2 is the second contribution rate.

12. The estimated steering angle calculation device for the vehicle according to claim 9, wherein the following equation is satisfied:

$$R1+R2=1\ (100[\%]),$$

wherein R1 is the first contribution rate and R2 is the second contribution rate.

13. The estimated steering angle calculation device for the vehicle according to claim 10, wherein the estimated steering angle calculation controller gradually decreases the first weighted estimated steering angle and gradually increases the second weighted estimated steering angle with increase of the accelerator opening degree.

14. The estimated steering angle calculation device for the vehicle according to claim 11, wherein the estimated steering angle calculation controller gradually decreases the first weighted estimated steering angle and gradually increases the second weighted estimated steering angle with increase of the change amount of the accelerator opening degree.

15. The estimated steering angle calculation device for the vehicle according to claim 12, wherein the estimated steering angle calculation controller gradually decreases the first weighted estimated steering angle and gradually increases the second weighted estimated steering angle with increase of the brake treading force.

16. A vehicle comprising the estimated steering angle calculation device according to claim 1.

17. A vehicle comprising the estimated steering angle calculation device according to claim 3.

18. A vehicle comprising the estimated steering angle calculation device according to claim 5.

* * * * *